US012711950B2

(12) United States Patent
Wu et al.

(10) Patent No.: US 12,711,950 B2
(45) Date of Patent: Aug. 18, 2026

(54) MULTI-LINGUAL AUTOMATIC SPEECH RECOGNITION FOR CONVERSATIONAL AI SYSTEMS AND APPLICATIONS

(71) Applicant: NVIDIA Corporation, Santa Clara, CA (US)

(72) Inventors: Xianchao Wu, Tokyo (JP); Scott Nunweiler, Yokohama (JP); Yang Zhang, New York, NY (US)

(73) Assignee: NVIDIA Corporation, Santa Clara, CA (US)

( * ) Notice: Subject to any disclaimer, the term of this patent is extended or adjusted under 35 U.S.C. 154(b) by 247 days.

(21) Appl. No.: 18/349,716

(22) Filed: Jul. 10, 2023

(65) Prior Publication Data

US 2025/0022457 A1 Jan. 16, 2025

(51) Int. Cl.
*G10L 15/065* (2013.01)
*G10L 15/16* (2006.01)

(52) U.S. Cl.
CPC ............ *G10L 15/065* (2013.01); *G10L 15/16* (2013.01)

(58) Field of Classification Search
None
See application file for complete search history.

(56) References Cited

U.S. PATENT DOCUMENTS 11,908,454 B2 * 2/2024 Thomas .................. G10L 15/02
2023/0047872 A1 * 2/2023 Khamis ................ B60N 2/0026
2024/0220215 A1 * 7/2024 Clement .................. G06F 8/35
2024/0419927 A1 * 12/2024 Agrawal ................ G06F 40/58

FOREIGN PATENT DOCUMENTS

CN 110827805 A * 2/2020 ............. G10L 15/02
CN 113096647 A * 7/2021 ........... G10L 15/063

OTHER PUBLICATIONS

Gao et al. "Difformer: Empowering Diffusion Model on Embedding Space for Text Generation" Dec. 19, 2022 (Year: 2022).*
Baevski, et al., "wav2vec 2.0: A Framework for Self-Supervised Learning of Speech Representations," 34th Conference on Neural Information Processing Systems (NeurIPS 2020), Vancouver Canada, 12 pages. https://proceedings.neurips.cc/paper/2020/file/92d1e1eb1cd6f9fba3227870bb6d7f07-Paper.pdf.

(Continued)

*Primary Examiner* — Pierre Louis Desir
(74) *Attorney, Agent, or Firm* — Lowenstein Sandler LLP

(57) ABSTRACT

Disclosed are systems and techniques for training machine learning models. The techniques include generating, using a first automatic speech recognition (ASR) model, a first text output based on a vector representation of a first speech data and generating, using a second ASR model, a second text output, wherein the second ASR model adds noise to a vector representation of the first text output to obtain a noisy vector representation of the first text output and is trained to remove the noise from the noisy vector representation of the first text output. The techniques include calculating a first loss of the second ASR model based at least on a comparison between the second text output and the first text output and modifying learnable parameters of the second ASR model to improve an accuracy of the second ASR model.

20 Claims, 6 Drawing Sheets

(56) References Cited

OTHER PUBLICATIONS

Baevski, et al., "Unsupervised Speech Recognition," 35th Conference on Neural Information Processing Systems (NeurIPS 2021), 14 pages. https://proceedings.neurips.cc/paper/2021/file/ea159dc9788ffac311592613b7f71fbb-Paper.pdf.
Blei, et al., "Variational Inference: A Review for Statisticians," Journal of the American Statistical Association, 2017, 112:518, 859-877, Review. DOI:10.1080/01621459.2017.1285773.
Devlin, et al., "BERT: Pre-training of Deep Bidirectional Transformers for Language Understanding," Proceedings of the Conference of the North American Chapter of the Association for Computational Linguistics: Human Language Technologies (NAACL-HLT 2019), vol. 1, Minneapolis, Minnesota, Jun. 2-Jun. 7, 2019. https://aclanthology.org/N19-1423.
Endres and Schindelin, "A New Metric for Probability Distributions," IEEE Transactions on Information Theory, vol. 49, No. 7, Jul. 2003, 1858-1860. https://research-repository.st-andrews.ac.uk/bitstream/handle/10023/1591/Endres2003-IEEETransInfTheory49-NewMetric.pdf?sequence=1.
Gulrajani, et al., "Improved Training of Wasserstein GANs," Part of Advances in Neural Information Processing Systems 30 (NIPS 2017), 11 pages. https://proceedings.neurips.cc/paper_files/paper/2017/file/892c3b1c6dccd52936e27cbd0ff683d6-Paper.pdf.
Ho, et al., "Denoising Diffusion Probabilistic Models," 34th Conference on Neural Information Processing Systems (NeurIPS 2020), Vancouver, Canada, arXiv:2006.11239v2 [cs.LG] Dec. 16, 2020, 25 pages. https://doi.org/10.48550/arXiv.2006.11239.
Ho, et al., "Denoising Diffusion Probabilistic Models," 34th Conference on Neural Information Processing Systems (NeurIPS 2020), Vancouver, Canada, 12 pages. https://proceedings.neurips.cc/paper/2020/file/4c5bcfec8584afod967f1ab10179ca4b-Paper.pdf.
Pratap, et al., "MLS: A Large-Scale Multilingual Dataset for Speech Research," Interspeech 2020, Oct. 25-29, 2020, Shanghai, China, 2757-2761. http://dx.doi.org/10.21437/Interspeech.2020-2826.
Ronneberger, et al., "U-Net: Convolutional Networks for Biomedical Image Segmentation," arXiv:1505.04597v1 [cs.CV] May 18, 2015, 8 pages. https://doi.org/10.48550/arXiv.1505.04597.
Sohl-Dickstein, et al, "Deep Unsupervised Learning using Nonequilibrium Thermodynamics," Proceedings of the 32nd International Conference on Machine Learning, Lille, France, 2015. JMLR: W&CP, vol. 37, arXiv:1503.03585v8 [cs.LG] Nov. 18, 2015, 18 pages. https://doi.org/10.48550/arXiv.1503.03585.
Song and Ermon, et al., "Generative Modeling by Estimating Gradients of the Data Distribution," 33rd Conference on Neural Information Processing Systems (NeurIPS 2019), Vancouver, Canada, 13 pages. https://proceedings.neurips.cc/paper/2019/file/3001ef257407d5a371a96dcd947c7d93-Paper.pdf.
Vaswani, et al., "Attention Is All You Need," 31st Conference on Neural Information Processing Systems (NIPS 2017), Long Beach, CA, USA, 11 pages. https://proceedings.neurips.cc/paper/2017/file/3f5ee243547dee91fbd053c1c4a845aa-Paper.pdf.
Wang and Cho, "Bert has a Mouth, and It Must Speak: BERT as a Markov Random Field Language Model," Proceedings of the Workshop on Methods for Optimizing and Evaluating Neural Language Generation (NeuralGen), pp. 30-36, Minneapolis, Minnesota, USA, Jun. 6, 2019. https://aclanthology.org/W19-2304.
Wang, et al., "Diffusion-GAN: Training GANs with Diffusion," arXiv:2206.02262v3 [cs.LG] Oct. 9, 2022, 28 pages. https://doi.org/10.48550/arXiv.2206.02262.

* cited by examiner

MULTI-LINGUAL AUTOMATIC SPEECH RECOGNITION FOR CONVERSATIONAL AI SYSTEMS AND APPLICATIONS

TECHNICAL FIELD

At least one embodiment pertains to a system for training and deploying speech recognition machine learning models.

BACKGROUND

Machine learning models can be trained to solve a variety of tasks. Specifically, some machine learning models can be trained to recognize speech (e.g., an automatic speech recognition (ASR) model), and then deployed to perform the same. Training such a model often requires large amounts of labeled training data, which can be costly to obtain. There are large amounts of unlabeled data available, but unsupervised ASR models often suffer from unstable training and mode collapse problems.

DETAILED DESCRIPTION

Figure 1:
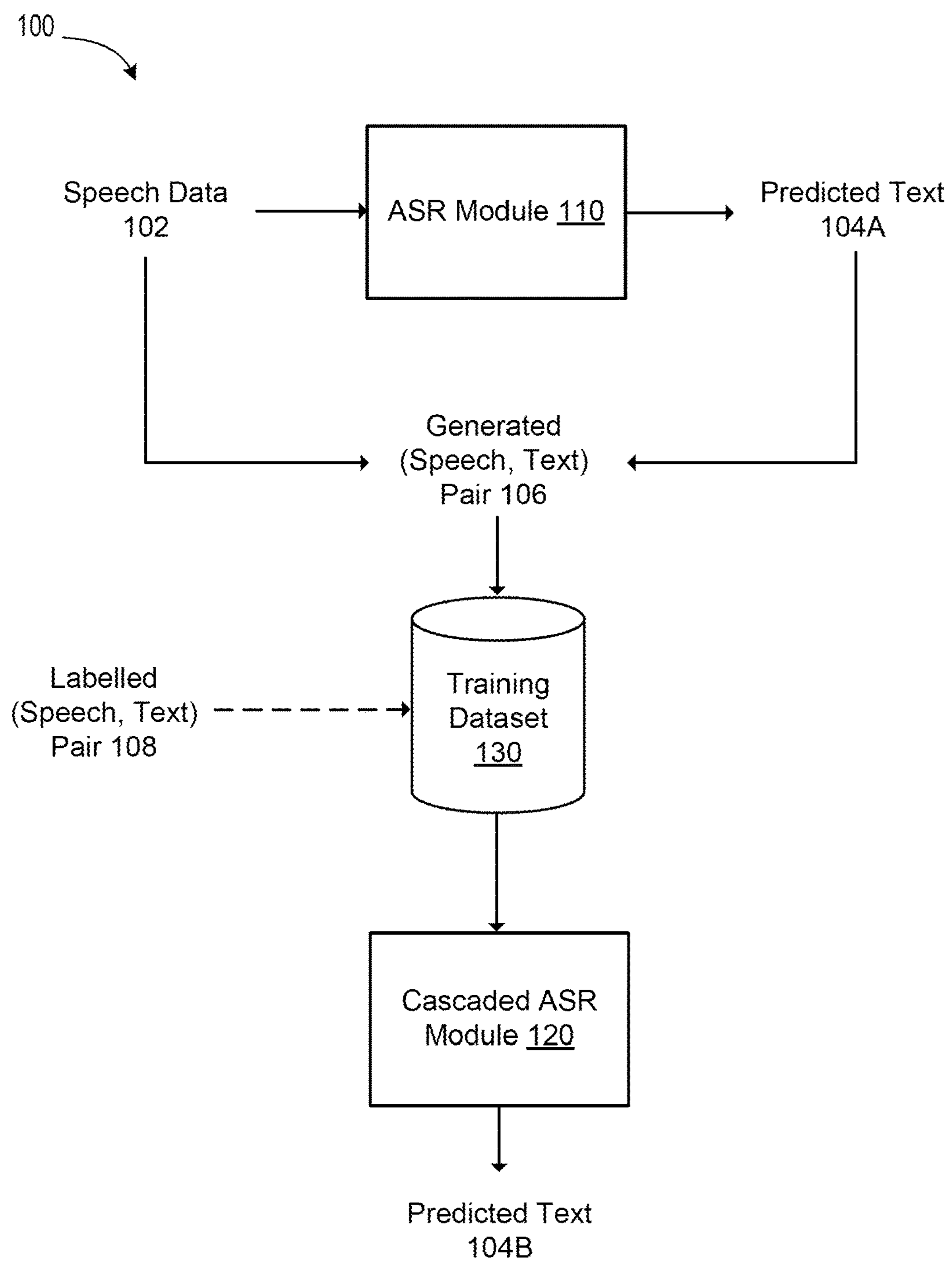
FIG. 1 illustrates an example data flow for training a cascaded ASR model, according to at least one embodiment.

Many unsupervised ASR models are based on generative adversarial network (GAN) models, which may suffer from unstable training and mode collapse problems. In a GAN model, a generator is trained to generate realistic outputs (e.g., images, text, speech waves, etc.), and a discriminator is trained to distinguish real outputs (e.g., labelled data in a training set) from generated outputs. Training the GAN model involves a delicate balance between the generator and the discriminator, and small changes to the model or the training procedure can cause oscillations in the loss function, making it difficult to converge to a stable solution (e.g., unstable training). In some cases, the generator may learn to generate a limited set of outputs that can fool the discriminator, instead of generating a diverse set of realistic outputs, leading to poor output quality and lack of diversity in the generated outputs (e.g., mode collapse).

Aspects and embodiments of the present disclosure address these and other technological challenges by providing systems and techniques that use a cascaded diffusion model (e.g., a machine learning model that includes a diffusion process and receives, as input, output from another machine learning model) for multi-lingual semi-supervised ASR. The cascaded diffusion model may receive as training data a plurality of (speech, text) pairs. The speech may be an audio associated with the text (e.g., a spoken version of the text) and may be represented as a mel-spectrogram, waveform audio file format (WAV) audio sequence, or the like. In some embodiments, the training data (e.g., (speech, text) pairs) are obtained from another ASR model (e.g., an unsupervised diffusion generative adversarial network (diffusion-GAN) model). For example, an audio file containing speech may be provided as input to an ASR model. The ASR model may output a predicted text form of the speech. The input speech and the output predicted text may be included as a pair in the training data for the cascaded diffusion model. In some embodiments, the ASR model may provide a confidence level associated with the predicted text and only text predictions whose confidence level exceed a predetermined threshold criterion are included in the training data. In some embodiments, the ASR model is an unsupervised ASR model.

In some embodiments, at least some of the training data is provided by users. For example, a user may be asked to record themselves reading aloud a sentence. The audio recording may be provided as the speech input in an input pairing and the sentence that was read aloud may be the text input of the input pairing. The input pairing may be added to the training data that is used to train the cascaded diffusion model. By adding a small number of labeled (speech, text) pairs, the accuracy of the cascaded diffusion ASR model can be greatly improved.

A vector representation of the speech data may be concatenated with a vector representation of the text data of a (speech, text) pair to form an input tensor (e.g., one or more vectors or tensors within an embedding space) for training the diffusion model. During each timestep of the diffusion process during training (e.g., during the forward diffusion process), noise (e.g., values sampled from a Gaussian noise distribution) may be added to the vector representation of the text data. The vector representation of the speech data may not be modified. During the reverse diffusion process (e.g., reconstruction process), the model learns to remove the noise that was added to the text data so that during an inference stage, the model can make an accurate prediction of the text starting from a sample of pure noise.

In some embodiments, the input speech data and the output text data are in the same language. In some embodiments, the input speech data is in a first language, and the output text data is in a second language (e.g., language translation). In some embodiments, the input speech data includes multiple languages, and the output text data similarly includes multiple languages (e.g., multi-lingual support).

The advantages of the disclosed techniques include, but are not limited to, improving an accuracy of a semi-supervised ASR model using only a small amount of labeled training data, resulting in decreasing the time and resources required to train the ASR model. The diffusion model may increase a robustness of the ASR model to noise and may eliminate the need to pre-process—e.g., perform feature extraction, normalization, etc., on—the speech data. Unlike some other models, training the diffusion model may be simplified by using a maximum likelihood estimation objective. The diffusion model may also provide an explicit likelihood function, which can be used to estimate the uncertainty of the generated speech signal. This may be beneficial for tasks such as keyword spotting and/or speaker identification. The diffusion model may also easily adapt to new speakers or domains by using a small amount of data to fine-tune the model.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational artificial intelligence (AI), light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an in-vehicle infotainment system of an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems for generating or presenting at least one of augmented reality content, virtual reality content, or mixed reality content, systems incorporating one or more virtual machines (VMs), systems for performing synthetic data generation operations, systems implemented at least partially in a data center, systems for performing conversational AI operations, systems implementing one or more language models-such as large language models (LLMs), systems for performing light transport simulation, systems for performing collaborative content creation for 3D assets, systems implemented at least partially using cloud computing resources, and/or other types of systems.

System Architecture

FIG. 1 illustrates an example data flow 100 for training a cascaded ASR model, according to at least one embodiment. For example, speech data 102 may be received and may be provided to ASR module 110. ASR module 110 may include a machine learning model used to convert speech to text. In some embodiments, ASR module 110 includes an unsupervised machine learning model. For example, ASR module 110 may include a diffusion generative adversarial network (diffusion-GAN) model. Speech data 102 may be a WAV file, a mel-spectrogram, and/or any other format accepted by ASR module 110. In some embodiments, speech data 102 is converted from an initial format to an input format that is accepted by ASR module 110 before being processed by ASR module 110.

ASR module 110 may convert speech data 102 to predicted text 104A, which may be a text representation of speech data 102. For example, by applying ASR module 110 to an audio, ASR module 110 may generate a textual representation of the audio. Speech data 102 and predicted text 104A may be combined to create generated (speech, text) pair 106. Generated (speech, text) pair 106 may be included in training dataset 130 along with other (speech, text) pairs. For example, ASR module 110 may receive a plurality of speech data and may generate text associated with each speech data. Each pair of speech and generated text data may be combined and added to training dataset 130. In some embodiments, ASR module 110 outputs a confidence value along with predicted text 104A. The confidence value may indicate a likelihood that the text accurately represents the input speech data. In some embodiments, only (speech, text) pairs whose confidence value exceeds a predetermined threshold (e.g., 90%) may be included in training dataset 130.

In some embodiments, labelled (speech, text) pair 108 may be added to training dataset 130. Labelled (speech, text) pair 108 may be provided by a user. For example, a user may be asked to record themselves reading aloud a sentence. The sentence may be included as the text portion of labelled (speech, text) pair 108, and the recorded speech may be included as the speech portion. As the (speech, text) pair may be provided by a user (instead of being generated by another machine learning model), it may be of very high quality, resulting in an improved cascaded ASR model.

In some embodiments, the speech portion of a (speech, text) pair and the text portion of the pair are in the same language. In some embodiments, the speech portion of a (speech, text) pair may be in a first language while the text portion is in a second language (e.g., language translation). In some embodiments, the speech portion includes speech in multiple languages and the text portion includes text in those same languages (e.g., multi-lingual support).

Cascaded ASR module 120 may include a diffusion machine learning model that is trained using the (speech, text) pairs in training dataset 130. The speech input and the text input of a given (speech, text) pair may be combined to create a single input tensor for the diffusion model. In some embodiments, the speech data is represented as a sequence of mel-spectrograms, where each frame of the mel-spectrogram includes a vector within an embedding space (e.g., an 80-dimension vector). For example, a neural network (e.g., Wav2Vec) may be used to convert the input speech data into vectors within an embedding space. The text data may be a represented as a sequence of discrete tokens (e.g., words, phonemes, IPA symbols, etc.). The text may be converted from discrete tokens into vectors within an embedding space (e.g., vectors each having 512 dimensions). In some embodiments, the embedding space of the text data may be different from the embedding space of the speech data. To convert the discrete tokens to vectors, an embedding mapping may be used, where each token is replaced by a vector within the embedding space. In some embodiments, the embedding mapping is performed using a lookup table. In some embodiments, the embedding mapping is performed using a neural network (e.g., Word2Vec). In some embodiments, the text data is converted from a first set of discrete tokens (e.g., words, phonemes) to a second set of discrete tokens (e.g., international phonetic alphabet (IPA) symbols). Then the second set of discrete tokens may be converted to the vector representation.

The vector representation of the speech data may be concatenated with the vector representation of the text data to form an input tensor for training the diffusion model of cascaded ASR module 120. During each timestep of the diffusion process during training (e.g., during the forward diffusion process), noise may be added to the vector representation of the text data. The vector representation of the speech data may not be modified. During the reverse diffusion process (e.g., reconstruction process), the diffusion model learns to remove the noise that was added to the text data so that during an inference stage, the model can make an accurate prediction of the text starting from a sample of pure noise. The diffusion and reconstruction processes are described in more detail below with regard to FIG. 3.

The reverse diffusion (e.g., reconstruction) process may be performed by a model that down samples and then up samples the noisy input tensor to remove the noise. For example, a UNet architecture may be used for the reverse diffusion process. The resulting tensor may be divided into a speech portion and a text portion. The text portion may be represented as one or more vectors within an embedding space, so a linear model with a softmax layer may be used to translate (e.g., "round") the vector representations back into discrete text tokens. In some embodiments, the diffusion model may include one or more attention models (e.g., self-attention, cross-attention, multi-head self-attention, etc.) to learn the important parts of the input tensor. For example, a cross-attention model may be used to learn which parts of the speech input correspond to specific parts of the text input.

A loss function may be used to evaluate an accuracy of the diffusion model. In some embodiments, the loss function is based on a variational lower bound (VLB) of the model. The learnable parameters of the diffusion model may be updated during training to minimize the loss of the model. The learnable parameters may include weights of the machine learning model, weights used in a neural network that converts discrete text tokens to vector representations, weights used in a neural network that converts vector representations of text to discrete text tokens, and/or the like. In some embodiments, the output text data of the diffusion model may be provided, along with the speech input data, as training data to ASR module 110.

In some embodiments, training the diffusion model may be simplified by using a maximum likelihood estimation (MLE) objective, a statistical method used to estimate the parameters of a model by maximizing a likelihood function. For example, with a diffusion model, MLE may estimate the parameters that govern the dynamics of the diffusion process.

A diffusion model may be used to describe the continuous evolution of a variable over time based on the idea that the variable follows a stochastic process characterized by a diffusion equation. MLE may be used to estimate the parameters of the diffusion equation based on observed data. A likelihood function such as $L(\theta|\text{data})$ may measure the probability of observing the given data based on a specific set of parameters $\theta$ (e.g., the likelihood function may quantify how likely the observed data is based on the parameters). To perform MLE based on a diffusion model, parameter values may be selected that maximize a likelihood function of the model. For example, a likelihood function may be determined based on the diffusion model and the observed data. A log-likelihood function may be calculated by taking the log of the likelihood function. The log-likelihood function may be optimized using one or more optimization algorithms (e.g., Newton-Raphson method, gradient-based optimization algorithms, such as gradient descent, expectation-maximization (EM) algorithm, etc.). The optimization algorithm may be used to maximize the log-likelihood function and estimate the parameter values that maximize the likelihood. The estimated parameter values may be evaluated in terms of their statistical properties, such as confidence intervals and/or hypothesis tests, to assess their reliability and significance.

By maximizing the likelihood function, MLE may estimate the parameters of the diffusion model that are most likely to have generated the observed data. These estimated parameters may be used for inference, prediction, and/or further analysis within the diffusion modeling framework.

During an inference stage, novel speech data (e.g., an audio file) may be provided as input to a deployed ASR model (e.g., cascaded ASR module 120). The trained diffusion model of cascaded ASR module 120 may perform automatic speech recognition and may output a textual representation of the speech (e.g., predicted text 104B). For example, the novel speech data (e.g., a vector representation of the novel speech data) may be concatenated with a random sample of noise (e.g., Gaussian noise). The diffusion model may use the learned reverse diffusion (e.g., reconstruction) process to incrementally remove noise from the random sample to obtain an accurate textual representation of the novel speech data.

More specifically, noise may be sampled from a fixed noise distribution (e.g., Gaussian noise). The noise may be iteratively denoised by, at each timestep, taking the current noisy signal and the noise level of the timestep and outputting a less noisy signal. The noise level is decreased until the signal contains text (or vector representations of text) without noise.

Figure 2:
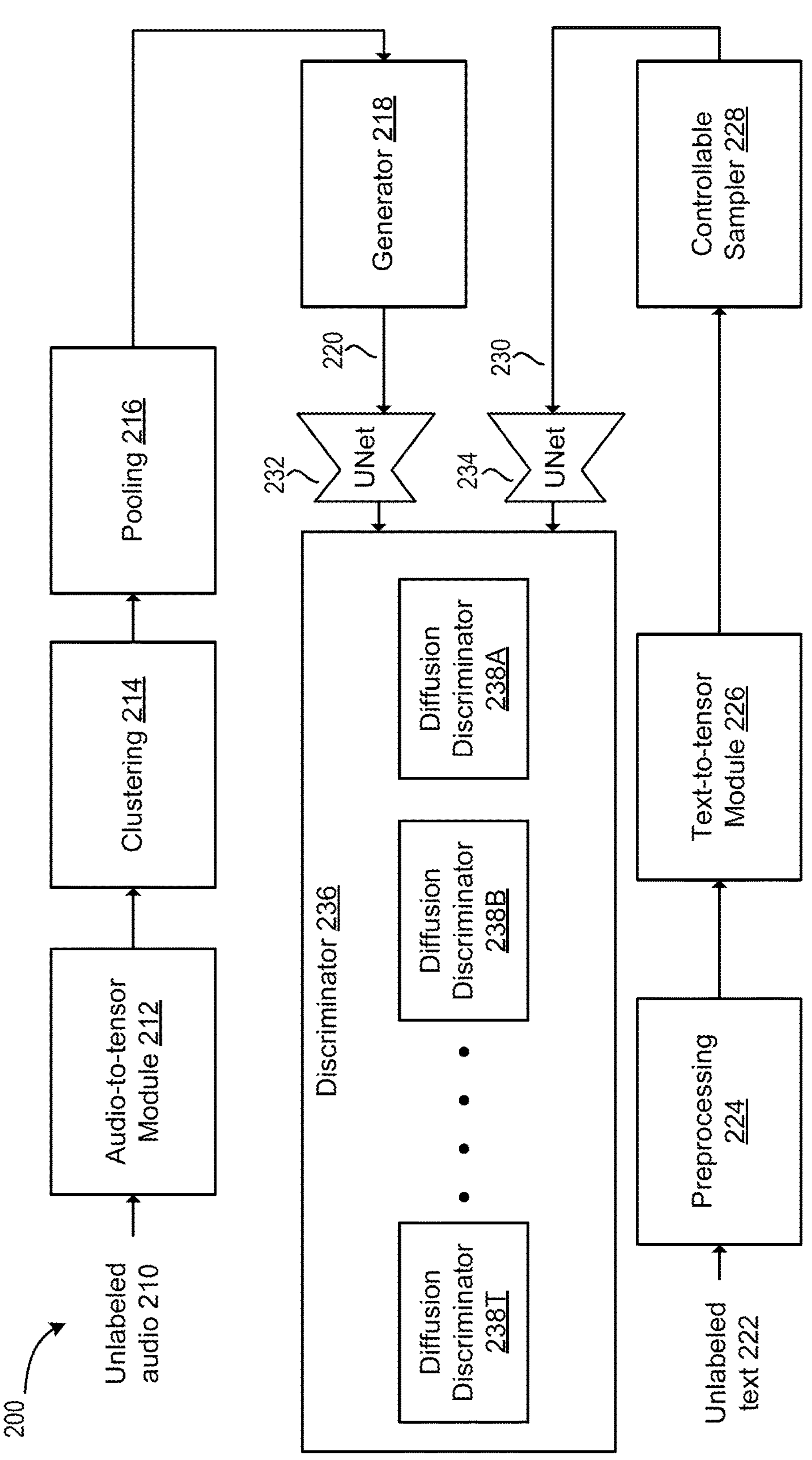
FIG. 2 illustrates an example machine learning model used for unsupervised ASR, according to at least one embodiment.

FIG. 2 illustrates an example machine learning model 200 used for unsupervised ASR, according to at least one embodiment. Machine learning model 200 may be a diffusion-GAN model used to convert speech data to text (e.g., ASR). Machine learning model 200 may include a Transformer-based language model (e.g., text-to-tensor module 226), a convolutional neural network for generating embeddings based on an audio input (e.g., audio-to-tensor module 212), a generator model (e.g., generator 218), and a discriminator model (e.g., discriminator 236) including a plurality of timestep dependent discriminators (e.g., diffusion discriminator 238A-T). During training of machine learning model 200, unlabeled audio 210 and unlabeled text 222 may be obtained (e.g., from a training dataset). Unlabeled audio 210 and unlabeled text 222 may be unrelated to one another. For example, unlabeled text 222 may not be a textual representation of unlabeled audio 210.

Unlabeled audio 210 may be provided to audio-to-tensor module 212, which may convert unlabeled audio 210 into a tensor including a sequence of vectors within an embedding space. Clustering 214 may cluster the vectors within the tensor (e.g., k-means clustering) by assigning a cluster identifier to each vector for audio segmentation. In some embodiments, clustering 214 may also perform principal component analysis (PCA) to reduce the size (e.g., dimension) of each vector of the tensor. Pooling 216 may then perform mean pooling on the tensor. For example, spans of vectors with similar cluster identifiers (e.g., from the k-means clustering) may be merged together by mean pooling. In some embodiments, a second mean pooling operation is performed between adjacent segments to alter the length of the tensor. The resulting tensor may be provided to generator 218 to create generated text sequence 220 corresponding to unlabeled audio 210. Generated text sequence 220 may include a sequence of words, phonemes, and/or IPA symbols (or vector representations of words, phonemes, and/or IPA symbols).

In some embodiments, unlabeled audio 210 may be clustered using a clustering algorithm (e.g., K-means clustering, gaussian mixture model (GMM)-based clustering, etc.) that groups audio data based on one or more attributes of a speaker of the speech data (e.g., speaker diarization). In some embodiments, speaker diarization may be performed using GMM-based clustering. For example, acoustic features may be extracted from unlabeled audio 210. In some embodiments, the features may include Mel Frequency Cepstral Coefficients (MFCCs) computed over a short time window (e.g., 20-30 milliseconds) with a sliding window. Unlabeled audio 210 may then be segmented into one or more frames. Each frame may have a fixed frame rate (e.g., 10 milliseconds). Each frame may be assigned to an initial cluster (e.g., randomly, using an initial clustering algorithm, such as K-means). In some embodiments, the number of initial clusters is estimated based on the data (e.g., unlabeled audio 210).

Each cluster may be modeled as a Gaussian Mixture Model (GMM) that represents the statistical distribution of the acoustic features within a cluster. Each cluster may be a combination of Gaussian distributions, and each Gaussian distribution may represent a speaker. Frames may be iteratively assigned to a cluster based on optimized GMM parameters. In some embodiments, the GMM parameters are optimized using an Expectation-Maximization (EM) algorithm. For example, the probability of each frame belonging to each cluster based on the current GMM parameters may be estimated. Based on the frame-cluster estimations, the GMM parameters may be updated. The GMM parameters may include the means, variances, and/or weights of the Gaussian components within each cluster, and the parameters may be updated to maximize the likelihood of the observed data given the current GMM parameters.

The frame-cluster estimations and parameter updates may be repeated until a convergence threshold is reached. In some embodiments, the convergence threshold is determined based on the amount of change in the likelihood calculation. In some embodiments, the convergence threshold is based on a maximum number of iterations. After convergence, the clustering results may be refined to merge or split clusters based on temporal or spectral characteristics (e.g., using agglomerative hierarchical clustering, voice activity detection, overlap detection, and/or the like). A unique identifier may be assigned to each of the resulting clusters, and each cluster may be mapped to the corresponding segment(s) in the audio file. In some embodiments, additional techniques such as i-vectors, deep neural networks (DNNs), and/or other machine learning approaches may be used to enhance the clustering accuracy.

Thus, the clustering algorithm may be trained to group speech data based on age, dialect, gender, and/or other attributes of the speaker of the audio. The clustering algorithm may assign an identifier (e.g., clustering ID) to the speech data and/or to portions of the speech data (e.g., unlabeled audio 210). The clustering identifier may be provided as an additional input to the diffusion discriminators 238A-T to distinguish speaker information from linguistic information included in the speech data.

Unlabeled text 222 may be provided to preprocessing 224, which may insert one or more silence tokens into unlabeled text 222 and may, if necessary, convert unlabeled text 222 from a first format to a second format that is accepted by text-to-tensor module 226. For example, unlabeled text 222 may be a sequence of words and may be converted to a sequence of phonemes or IPA symbols by preprocessing 224. The processed text may be provided to text-to-tensor module 226 which may generate a tensor including a sequence of vectors within an embedding space, each vector representing a token (e.g., word, phoneme, IPA symbol, etc.) of the processed text. Text-to-tensor module 226 may include a trained machine learning model that has learned the contextual distribution of phonemes of a given language. In some embodiments, text-to-tensor module 226 may include a Transformer-based machine learning model. For example, text-to-tensor module 226 may be a Bidirectional Encoder Representations from Transformers (BERT) style language model that receives a sequence of masked phonemes and outputs a new sequence of phonemes (or vector representations of phonemes) matching the same distribution of the received phonemes. Text-to-tensor module 226 may be connected to controllable sampler 228 that may request a number of phonemes (or vector representations of phonemes) from text-to-tensor module 226 based on the resulting length of the audio tensor after pooling 216. Controllable sampler 228 may output a reference text sequence 230 that matches the length of generated text sequence 220. Because reference text sequence 230 may be a generated sequence, reference text sequence 230 may be a used as a pseudo ground truth value in discriminator 236. Reference text sequence 230 may include a sequence of words, phonemes, and/or IPA symbols (or vector representations of words, phonemes, and/or IPA symbols).

Generated text sequence 220 may be provided to UNet 232, and reference text sequence 230 may be provided to UNet 234. UNet 232 and UNet 234 may each be a symmetrical (or unsymmetrical) U-shaped neural network for down-sampling and subsequently up-sampling generated text sequence 220 and reference text sequence 230, respectively. For example, UNet 232 (and/or UNet 234) may include layers to down-sample each vector of generated text sequence 220 from 512 dimensions to 256 dimensions to 128 dimensions to 64 dimensions and layers to up-sample each vector from 64 dimensions to 128 dimensions. In some embodiments, there are skip connections between layers of UNet 232 (and/or UNet 234) to preserve features from a first layer in a second layer. For example, there may be a skip connection from the first down-sampling layer to the last up-sampling layer.

The output of UNet 232 and UNet 234 may be provided to discriminator 236, which may learn to discriminate between generated text sequence 220 and reference text sequence 230. Discriminator 236 may include one or more diffusion discriminators 238A-T. Each diffusion discriminator 238A-T may represent a timestep t between 0 and T. Individual diffusion discriminators 238A-T may receive, as input, the output of UNet 232 (e.g., the result of processing generated text sequence 220) and may receive, as a target output, the output of UNet 234 (e.g., the result of processing reference text sequence 230). Individual diffusion discriminators 238A-T may add noise to the input and target output to increase a robustness of generator 218. Each diffusion discriminator may add noise based on their corresponding timestep, $t \in [0, T]$. For example, diffusion discriminator 238A (at t=0) may add no noise (or a small amount of noise) to its input and target output. Diffusion discriminator 238B (at t=1) may add more noise than diffusion discriminator 238A added. Each subsequent diffusion discriminator may add more noise than the previous diffusion discriminator, until reaching a final diffusion discriminator 238T (at t=T) (e.g., diffusion process). Individual diffusion discriminator 238A-T may output a result indicating whether the input text was generated text or (pseudo) reference text. Based on the results of each diffusion discriminator 238A-T, generator 218 may be updated (e.g., through back-propagation) to generate text sequences that better align with the phoneme distribution of the trained language model of text-to-tensor module 226.

During an inference stage using machine learning model 200 for ASR, novel audio data may be provided to audio-to-tensor module 212. The output may go through clustering 214 and pooling 216 to reach generator 218, which may output a text sequence representing the novel audio.

Figure 3:
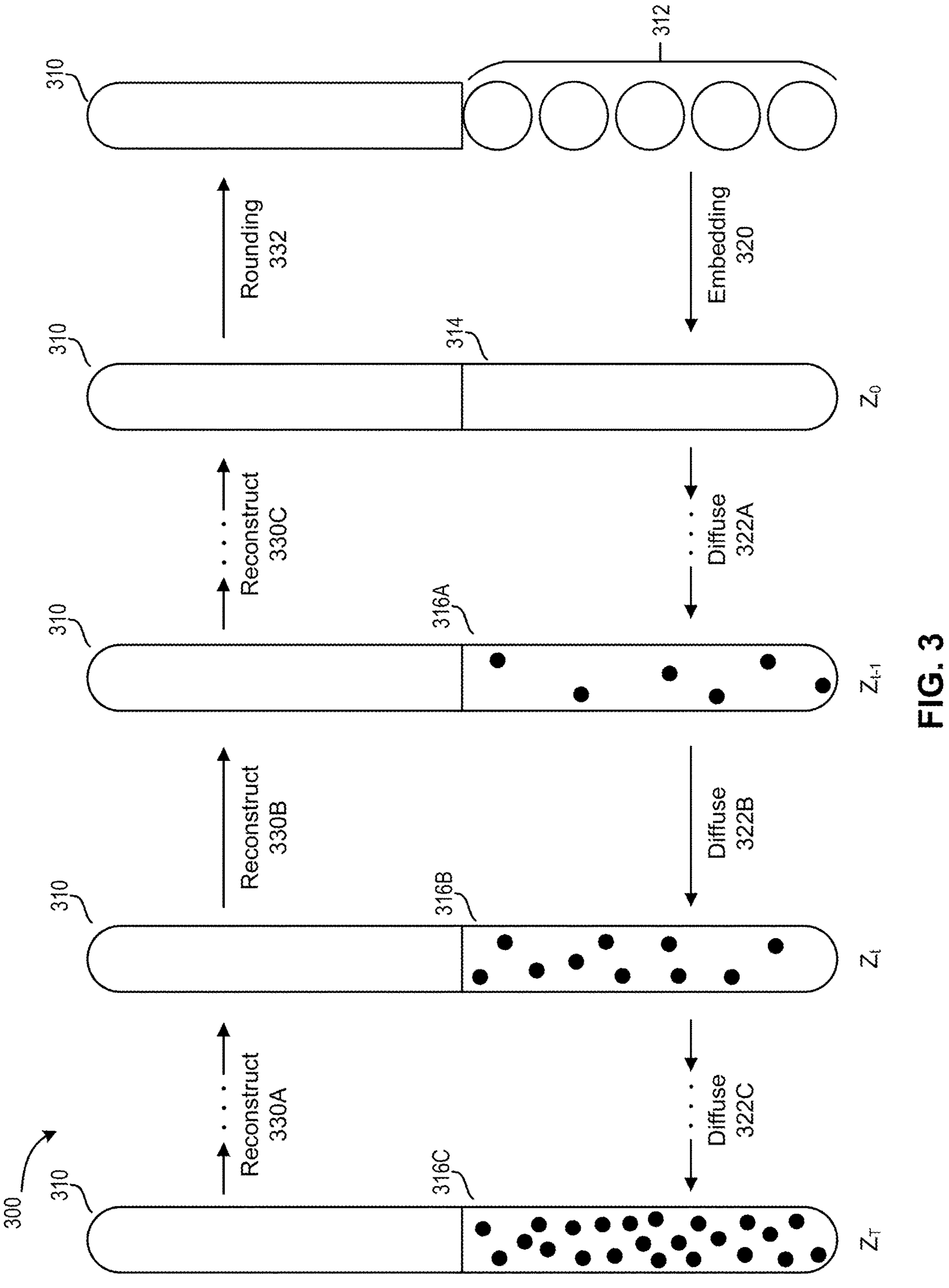
FIG. 3 illustrates an example diffusion and reconstruction process for training an ASR model, according to at least one embodiment.

FIG. 3 illustrates an example diffusion and reconstruction process 300 for training an ASR model, according to at least one embodiment. A training (speech, text) pair may be received by a diffusion model (e.g., the diffusion model of cascaded ASR module 120 of FIG. 1). The (speech, text) pair may include a speech portion 310 and a text portion 312.

Speech portion 310 may be represented as a sequence of mel-spectrograms, where each frame of the mel-spectrogram includes a vector within an embedding space (e.g., an 80-dimension vector). Text portion 312 may be represented as a sequence of discrete tokens. Text portion 312 may be converted (e.g., embedding 320) from discrete tokens into text vectors 314. In some embodiments, the discrete tokens are converted using a look-up table or embedding map that maps each discrete token into a vector. In some embodiments, a neural network is used to convert each discrete token into a vector. Each discrete text token may correspond to a vector within an embedding space (e.g., a 512-dimension vector). Speech portion 310 and text vectors 314 may be concatenated to form an input tensor $Z_0$. During the forward diffusion process (e.g., diffuse 322A-C), noise (represented as black circles) may be added incrementally to text vectors 314. For example, at time t−1, input tensor $Z_{t-1}$ may include (unmodified) speech portion 310 and noisy text vectors 316A. Additional noise may be added (e.g., via diffuse 322B) to obtain input tensor $Z_t$ with speech portion 310 and noisy text vectors 316B. This process may continue, gradually adding noise and incrementing t until, at t=T, input tensor $Z_T$ includes speech portion 310 and noisy text vectors 316C.

During the reverse diffusion process (e.g., reconstruct 330A-C), the diffusion model may learn to remove noise from the text vectors of a given tensor $Z_t$, to obtain $Z_{t-1}$. For example, at time t, input tensor Z may include speech portion 310 and noisy text vectors 316B. The diffusion model may learn to remove noise (e.g., reconstruct 330B) from noisy text vectors 316B to obtain $Z_{t-1}$. This process may continue, gradually removing noise and decrementing t until, at t=0, input tensor $Z_0$ includes speech portion 310 and (original or close to original) text vectors 314.

Text vectors 314 may then be converted back to discrete tokens (e.g., rounding 332). In some embodiments, text vectors 314 are converted using a neural network with a softmax layer that maps each vector to a discrete text token within a vocabulary. The discrete text tokens may represent the textual output of the cascaded ASR model. In some embodiments, the discrete text tokens are post-processed (e.g., converting phonemes and/or IPA symbols to words) before being output by the cascaded ASR model.

The diffusion model may be evaluated using a loss function. The loss function may be based on a variational lower bound (VLB) of the model. For example, in some embodiments, the following loss function is used:

$$L_{VLB} = \mathbb{E}_{q(Z_{1:T}|Z_0)}\left[\log\frac{q(z_T\,|\,z_0)}{p_\theta(z_T)} + \sum_{t=2}^{T}\log\frac{q(z_{t-1}\,|\,z_0, z_t)}{p_\theta(z_{t-1}\,|\,z_t)} + \log\frac{q_\phi(z_0\,|\,w^{x\oplus y})}{p_\theta(z_0\,|\,z_1)} - \log p_\theta(w^{x\oplus y}\,|\,z_0)\right]$$

where x stands for the speech expressed by mel-spectrogram vectors and y stands for the text vectors. W stands for the concatenated sequence of vectors x⊕y. The conditional distribution $q(Z_{1:T}|Z_0)$ may represent the forward diffusion process. The forward diffusion process may not depend on any trainable parameters. The embedding matrix $q_\phi(Z_0|W)$ is learnable for the textual side of the concatenated sequence. This embedding matrix assigns a dense vector to each discrete text token of the text portion. The rounding neural network $p_\theta(W|Z_0)$ projects $Z_0$ back to a sequence of discrete text tokens. The reverse diffusion (e.g., reconstruction) process is controlled by the distribution $p_\theta(Z_{t-1}|Z_t)$. In some embodiments, a UNet architecture, together with mulihead self-attention, is used to predict the noise included in $Z_t$, in order to erase the noise and recover $Z_{t-1}$. The noise is removed incrementally until reaching $Z_0$.

Figure 4:
FIG. 4 is a flow diagram of an example method of training a cascaded ASR model, according to at least one embodiment.
Figure 4:
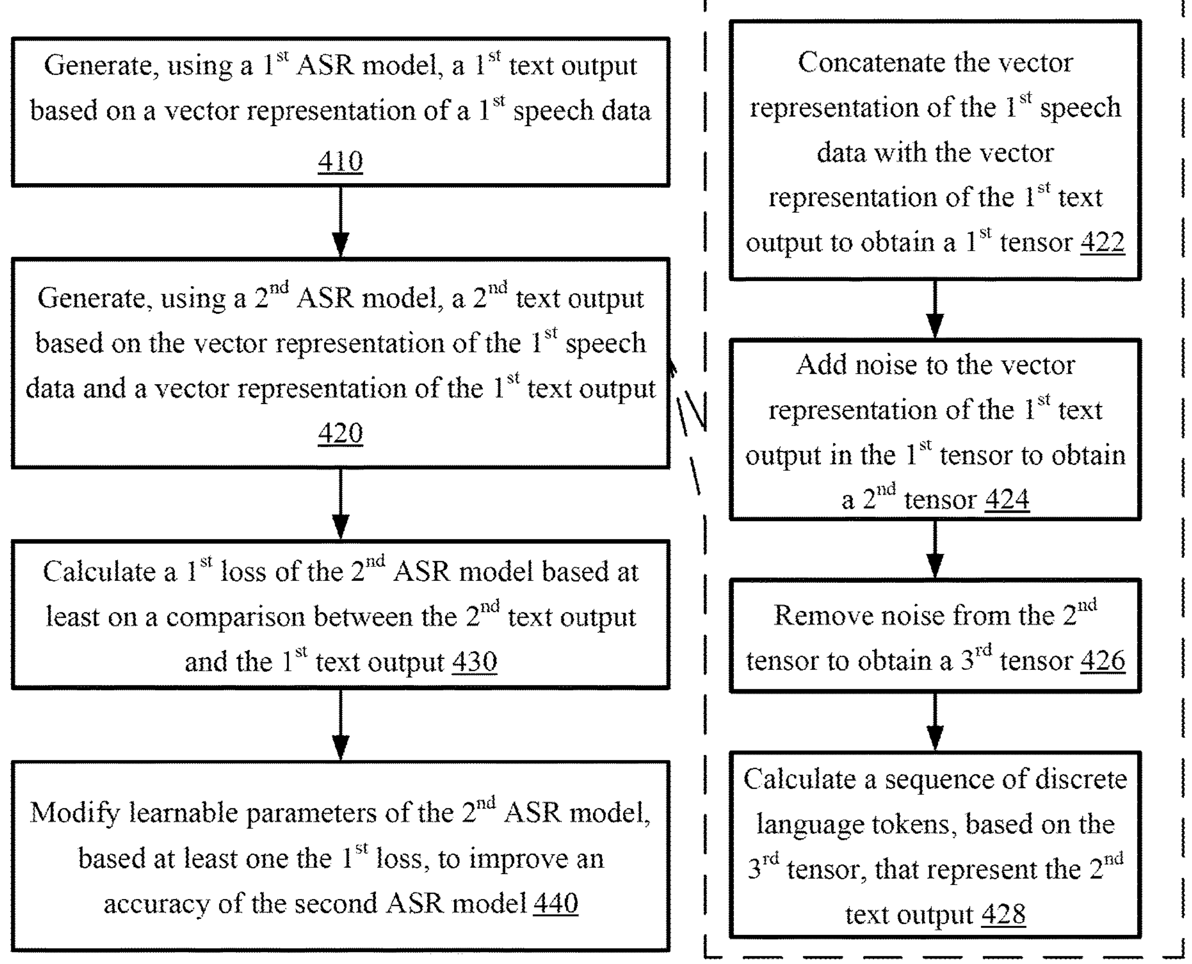
Figure 5:
FIG. 5 is a flow diagram of an example method of training a cascaded ASR model, according to at least one embodiment.
Figure 5:
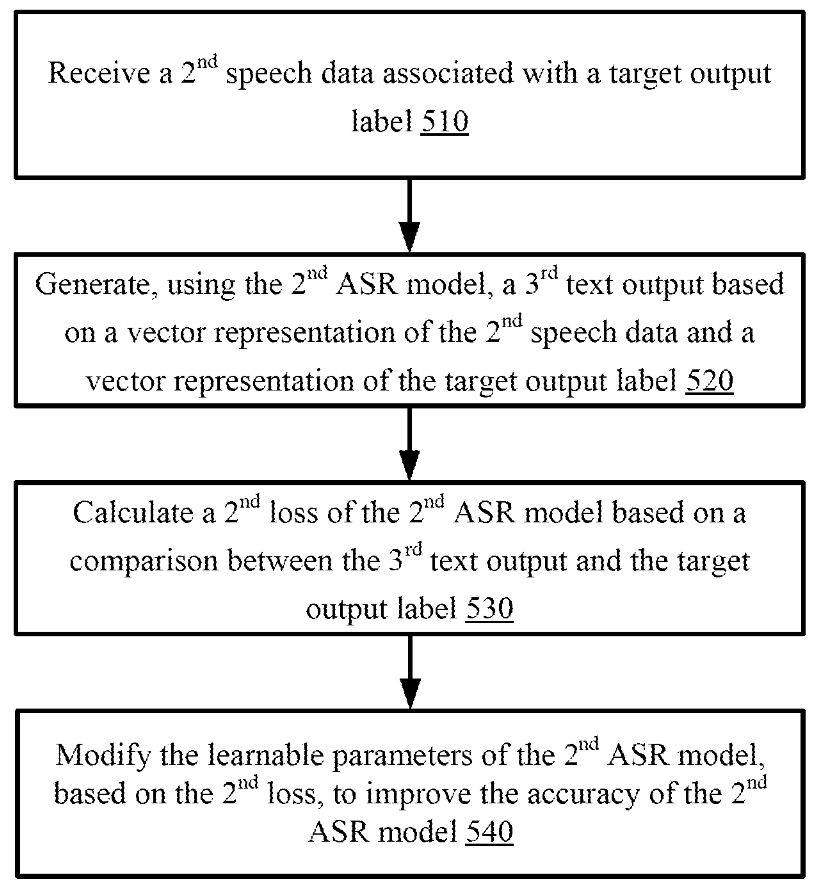

FIGS. 4-5 are flow diagrams of example methods 400 and 500 of training a cascaded ASR model, according to at least one embodiment. Methods 400 and 500 may be performed using one or more processing units (e.g., central processing units (CPUs), graphic processing units (GPUs), accelerators, physic processing units (PPUs), data processing units (DPUs), etc.), which may include (or communicate with) one or more memory devices. In at least one embodiment, methods 400 and 500 may be performed by example computing device 600. In at least one embodiment, processing units performing any of methods 400 and 500 may be executing instructions stored on a non-transitory computer-readable storage media. In at least one embodiment, any of methods 400 and 500 may be performed using multiple processor threads (e.g., CPU threads and/or GPU threads), individual threads executing one or more individual functions, routines, subroutines, or operations of the method. In at least one embodiment, processing threads implementing any of methods 400 and 500 may be synchronized (e.g., using semaphores, critical sections, and/or other thread synchronization mechanisms). Alternatively, processing threads implementing any of methods 400 and 500 may be executed asynchronously with respect to each other. Various operations of methods 400 and 500 may be performed in a different order compared with the order shown in FIGS. 4-5. Some operations of methods 400 and 500 may be performed concurrently with other operations. In at least one embodiment, one or more operations shown in FIGS. 4-5 may not always be performed.

FIG. 4 is a flow diagram of an example method 400 of training a cascaded ASR model, according to at least one embodiment. At block 410, one or more processing devices performing method 400 may generate, using a first automatic speech recognition (ASR) model, a first text output based on a vector representation of a first speech data. The first text output has an associated confidence value. At block 420, the one or more processing devices may generate, using a second ASR model and responsive to the confidence value satisfying a threshold condition, a second text output based on the vector representation of the first speech data and a vector representation of the first text output. The second ASR model may add noise to the vector representation of the first text output to obtain a noisy vector representation of the first text output and may be trained to remove the noise from the noisy vector representation of the first text output.

At block 430, the one or more processing devices may calculate a first loss of the second ASR model based at least on a comparison between the second text output and the first text output. The first loss may indicate an ability of the second ASR model to remove noise from the noisy vector representation of the first text output. At block 440, the one or more processing devices may modify learnable parameters of the second ASR model, based at least on the first loss, to improve an accuracy of the second ASR model. In some embodiments, the accuracy of the second ASR model is improved by minimizing a loss of the second ASR model.

In some embodiments, to generate the second text output, the one or more processing devices may perform the operations in the callout box of FIG. 4. For example, the one or more processing devices may, at block 422, concatenate the vector representation of the first speech data with the vector representation of the first text output to obtain a first tensor.

At block 424, the one or more processing devices may add noise to the vector representation of the first text output in the first tensor to obtain a second tensor. At block 426, the one or more processing devices may remove noise from the second tensor to obtain a third tensor. At block 428, the one or more processing devices may calculate a sequence of discrete language tokens, based on the third tensor, that represent the second text output.

FIG. 5 is a flow diagram of an example method 500 of training a cascaded ASR model, according to at least one embodiment. In some embodiments, method 500 may be performed after method 400. At block 510, one or more processing devices performing method 500 may receive a second speech data associated with a target output label. At block 520, the one or more processing devices may generate, using the second ASR model, a third text output based on a vector representation of the second speech data and a vector representation of the target output label. At block 530, the one or more processing devices may calculate a second loss of the second ASR model based on a comparison between the third text output and the target output label. At block 540, the one or more processing devices may modify the learnable parameters of the second ASR model, based on the second loss, to improve the accuracy of the second ASR model.

Figure 6:
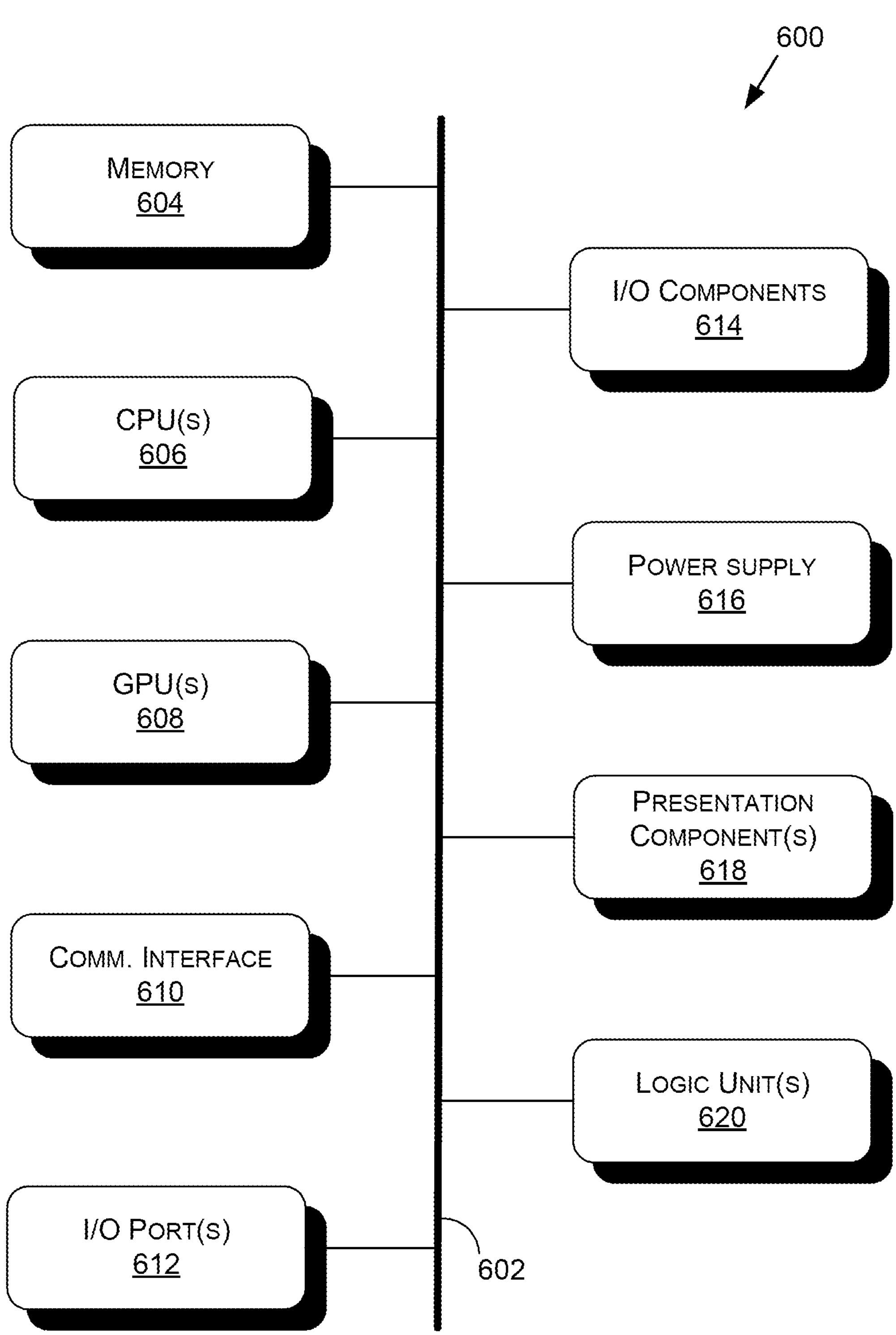
FIG. 6 is a block diagram of an example computing device suitable for training and/or deploying a cascaded ASR model, in accordance with at least some embodiments.

FIG. 6 is a block diagram of an example computing device(s) 600 suitable for training and/or deploying a cascaded ASR model, in accordance with at least some embodiments. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s)), such as an operating system. In accordance with one or more aspects of the present disclosure, the computer-readable instructions can comprise executable instructions for executing method 400 and/or method 500 of training a cascaded ASR model. Computer-storage media may include, but is not limited to, random-access memory (RAM), read-only memory (ROM), electronically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, radio frequency (RF), infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. For example, in accordance with one or more aspects of the present disclosure, the CPU(s) 606 may be configured to execute instructions executing methods 400-500 of training a cascaded ASR model. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B. C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

generating, using a first automatic speech recognition (ASR) model comprising an unsupervised diffusion generative adversarial network model and based at least on a first vector representation of first speech data, a first text output and a confidence value indicating a probability of the first text output representing the first speech data;

based at least on the confidence value satisfying a threshold criterion, generating, using a second ASR model and based at least on a second vector representation of the first speech data and a third vector representation of the first text output, a second text output, wherein the second ASR model adds noise to the third vector representation of the first text output to obtain a noisy vector representation of the first text output;

calculating a first loss of the second ASR model based at least on a comparison between the second text output and the first text output, the first loss indicating an ability of the second ASR model to remove noise from the noisy vector representation of the first text output;

modifying one or more learnable parameters of the second ASR model based at least on the first loss to train the second ASR model to remove noise from the noisy vector representation of the first text output; and applying the second ASR model, after modifying the one or more learnable parameters, to second speech data to generate a textual representation of the second speech data.

2. The method of claim 1, further comprising:

receiving second speech data associated with a target output label;

generating, using the second ASR model and based at least on a fourth vector representation of the second speech data and a fifth vector representation of the target output label, a third text output;

calculating a second loss of the second ASR model based at least on a comparison between the third text output and the target output label; and modifying the one or more learnable parameters of the second ASR model based at least on the second loss.

3. The method of claim 2, wherein the first ASR model is modified based on the third text output.

4. The method of claim 2, wherein the second speech data comprises data of a first language and data of a second language and the third text output comprises text of the first language and text of the second language.

5. The method of claim 1, wherein the second ASR model is a diffusion model.

6. The method of claim 1, wherein the generating the second text output comprises:

concatenating the first vector representation of the first speech data with the third vector representation of the first text output to obtain a first tensor;

adding noise to the third vector representation of the first text output in the first tensor to obtain a second tensor;

removing noise from the second tensor to obtain a third tensor; and calculating a sequence of discrete language tokens, based at least on the third tensor, that represent the second text output.

7. The method of claim 6, wherein at least one of the discrete language tokens comprises:

a word;

a phoneme; or an international phonetic alphabet symbol.

8. The method of claim 1, wherein the first loss of the second ASR model is based at least on a variational lower bound of the second ASR model.

9. The method of claim 1, wherein the first ASR model is trained, at least in part, using a clustering algorithm that groups speech data based at least on one or more attributes of a speaker of the speech data.

10. A method comprising:

obtaining a textual representation of first speech data based at least on applying a first deployed automatic speech recognition (ASR) model to the first speech data, wherein the first deployed ASR model is trained, at least in part, by:

generating, using a first ASR model comprising an unsupervised diffusion generative adversarial network model and based at least on second speech data, a first text output;

generating, using a second ASR model and based at least on the second speech data and the first text output, a second text output, wherein the second ASR model adds noise to the first text output to obtain a noisy representation of the first text output;

calculating a first loss of the second ASR model based at least on a comparison between the second text output and the first text output, the first loss indicating an ability of the second ASR model to remove noise from the noisy representation of the first text output; and modifying one or more learnable parameters of the second ASR model based at least on the first loss to train the second ASR model to remove noise from the noisy representation of the first text output.

11. The method of claim 10, wherein the first deployed ASR model is further trained, at least in part, by:

receiving a third speech data associated with a target output label;

generating, using the second ASR model and based at least on the third speech data and the target output label, a third text output;

calculating a second loss of the second ASR model based on a comparison between the third text output and the target output label; and modifying the one or more learnable parameters of the second ASR model based at least on the second loss.

12. The method of claim 11, wherein the first ASR model is modified based on the third text output.

13. The method of claim 11, wherein the third speech data comprises data of a first language and data of a second language and the third text output comprises text of the first language and text of the second language.

14. The method of claim 10, wherein the second ASR model includes a diffusion model.

15. The method of claim 10, wherein the generating the second text output comprises:

concatenating the second speech data with the first text output to obtain a first tensor;

adding noise to the first text output in the first tensor to obtain a second tensor;

removing noise from the second tensor to obtain a third tensor; and calculating a sequence of discrete language tokens, based at least on the third tensor, that represent the second text output.

16. The method of claim 15, wherein at least one of the discrete language tokens comprises:

a word;

a phoneme; or an international phonetic alphabet symbol.

17. The method of claim 10, wherein the first loss of the second ASR model is based at least on a variational lower bound of the second ASR model.

18. The method of claim 10, wherein the first ASR model is further trained, at least in part, using a clustering algorithm that groups speech data based on one or more attributes of a speaker of the speech data.

19. A system comprising:

one or more processing units to:

apply a first deployed automatic speech recognition (ASR) model to first speech data to obtain a text representation of the first speech data, wherein the first deployed ASR model is trained, at least in part, by:

generating, using a first ASR model comprising an unsupervised diffusion generative adversarial network model and based at least on second speech data, a first text output;

generating, using a second ASR model and based at least on the second speech data and the first text output, a second text output, wherein the second ASR model adds noise to the first text output to obtain a noisy representation of the first text output;

calculating a first loss of the second ASR model based at least on a comparison between the second text output and the first text output, the first loss indicating an ability of the second ASR model to remove noise from the noisy representation of the first text output; and modifying one or more learnable parameters of the second ASR model, based at least on the first loss to train the second ASR model to remove noise from the noisy representation of the first text output, wherein the second ASR model, after training, represents the first deployed ASR model.

20. The system of claim 19, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of augmented reality content, virtual reality content, or mixed reality content;

a system implemented using a robot;

a system for performing conversational AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

* * * * *